United States Patent [19]

Bryan et al.

[11] Patent Number: 5,317,612

[45] Date of Patent: May 31, 1994

[54] USE OF SHAPE MEMORY ALLOYS IN FUEL PELLET HOLDDOWN SPRINGS

[75] Inventors: William J. Bryan; Lawrence V. Corsetti, both of Granby, Conn.

[73] Assignee: Combustion Engineering, Inc., Windsor, Conn.

[21] Appl. No.: 950,590

[22] Filed: Sep. 25, 1992

[51] Int. Cl.⁵ .............................................. G21C 3/10
[52] U.S. Cl. ................................... 376/451; 376/412
[58] Field of Search .............. 376/451, 450, 251, 253, 376/412, 413; 976/DIG. 52, DIG. 51

[56] References Cited

U.S. PATENT DOCUMENTS

| | | | |
|---|---|---|---|
| 4,435,229 | 3/1984 | Johnson | 148/11.5 R |
| 4,659,544 | 4/1987 | Sawayama et al. | 376/451 |
| 4,699,757 | 10/1987 | Clone | 376/412 |
| 4,790,624 | 12/1988 | Van Hoye et al. | 350/96.26 |

*Primary Examiner*—Donald P. Walsh
*Assistant Examiner*—Meena Chelliah
*Attorney, Agent, or Firm*—Ronald P. Kananen; John H. Mulholland

[57] ABSTRACT

A composite holddown spring for applying an axial force to a fuel pellet stack in a nuclear reactor fuel rod. The composite holddown spring comprises a shape-memory alloy spring portion and a conventional metal spring portion. The shape-memory alloy spring portion has a two-way memory characteristic such that it contracts to a low temperature configuration at ambient temperatures wherein the axial force exerted by the shape-memory alloy spring portion is minimized and expands to a high temperature configuration at operating conditions wherein the axial force exerted by the shape-memory alloy spring portion is maximized. Somewhat conversely, the conventional metal spring portion weakens and contracts at operating temperature and strengthens and expands at atmospheric temperature.

8 Claims, 2 Drawing Sheets

USE OF SHAPE MEMORY ALLOYS IN FUEL PELLET HOLDDOWN SPRINGS

FIELD OF THE INVENTION

The invention described herein relates to holddown springs for use in minimizing pellet-to-pellet gaps in nuclear fuel rods. More particularly, the invention relates to the use of shape-memory alloys in fuel pellet holddown springs.

BACKGROUND OF THE INVENTION

Commercial nuclear reactors used for generating electric power include a core composed of a multitude of fuel assemblies which generate heat used for electric power generation purposes. Each fuel assembly includes an array of fuel rods held in spaced relationship with each other by spacer grids. The fuel rods may be approximately 0.5 inches in diameter and about 12 feet long and typically comprise a hollow zirconium alloy tube, or cladding, which is filled with a stacked column of cylindrical uranium dioxide fuel pellets and provided with zirconium alloy end caps.

After multiple cycles of operation, highly localized concentrations of zirconium hydride have been observed in the cladding at locations corresponding to pellet-to-pellet gaps in the uranium dioxide fuel column. The localized concentrations are believed to be due to hydrogen migration. Hydrogen apparently peripherally migrates down the thermal gradients that arise in the cladding from "cool spots" associated with the formation of pellet-to-pellet gaps. The source of the hydrogen is believed to be the water-side corrosion process which liberates hydrogen which is, in turn, absorbed by the cladding. When the concentration of hydrogen in a local region of the cladding exceeds the solubility limit at a given temperature, a phase transformation occurs, resulting in the formation of delta- phase zirconium hydride. Such local concentrations of zirconium hydride at fuel column gaps have been confirmed by Combustion Engineering, Inc., the assignee of the present invention, in fuel rods irradiated for multiple cycles.

A high local concentration of zirconium hydride can diminish cladding performance capability. For example, at the ANS Topical meeting on Fuel Performance in April, 1991, results from a failure diagnostic program on 2-cycle fuel rods were presented which suggested a link between local zirconium hydride concentrations at fuel pellet gaps and fuel failure.

The cause of approximately 21% of the fuel rod failures experienced by Combustion Engineering, Inc. is not known. Local zirconium hydride concentrations at fuel pellet gaps are suspected as being responsible for a portion of these failures, particularly in those cases where failure occurred during the second or third cycle of operation. Therefore, any method of lessening or eliminating these fuel pellet gaps would be beneficial.

One way of decreasing the number and extent of the fuel pellet gaps that are formed during operation is to maintain a force on the fuel pellet stack. Presently, fuel pellet holddown springs are made of stainless steel. Unfortunately, after a cycle of operation, stainless steel springs lose their holddown capability at high temperatures and their effectiveness in reducing fuel pellet gaps is therefore compromised.

SUMMARY OF THE INVENTION

In view of the foregoing, it is readily apparent that conventional fuel pellet holddown springs do not provide adequate holddown force on the fuel pellet stack after multiple cycles of operation. One advantage of the present invention is the elimination of reduction of the above problems encountered in prior art holddown springs.

These and other advantages have been achieved by providing a fuel pellet holddown spring comprising a conventional holddown spring material, such as stainless steel, and a two-way shape-memory alloy, such as a nickel-titanium alloy. Accordingly, when reactor coolant temperature increases, the shape-memory alloy spring expands, while the conventional spring weakens and is compressed. As coolant temperature decreases, the shape-memory alloy spring contracts, while the steel spring strengthens and expands.

Upon further study of the specification and appended claims, further advantages of this invention will become apparent to those skilled in the art.

DETAILED DESCRIPTION OF THE INVENTION

The present invention provides fuel pellet holddown springs which are able to maintain adequate holddown force on the fuel pellet stack after one or more heatup cycles. The fuel pellet holddown springs of the present invention can also provide substantial holddown force at both high (operational) and low (ambient) temperatures.

According to an embodiment of the present invention, a fuel pellet holddown spring is provided which comprises a shape-memory alloy. Shape-memory alloys are well known in the art. See, for example, C. M. Wayman, *Journal of Metals*, pp. 129–137, June 1980; *Encyclopedia of Materials Science and Engineering*, MIT Press, Cambridge, Mass., Vol. 6, pp. 4635–4674 (1986); and *Kirk-Othmer Encyclopedia of Chemical Technology*, John Wiley & Sons, New York, Vol. 20, pp. 726–736 (1982), the disclosures of which are incorporated herein by reference.

When an ordinary metal is strained beyond its elastic limit, permanent deformation of the material is produced. For most metals, this yield point corresponds to a fraction of a percent strain. Any strain beyond this point is defined as plastic deformation and is expected to remain. For example, it would be very surprising if an extensively kinked metal wire were to straighten out spontaneously when heated. However, this is exactly what certain shape-memory alloys are able to do. If one of these alloys is deformed below a critical temperature, it may recover its original unbent shape when it is reheated. The reheating "reminds" the alloy that it prefers a different crystal structure and associated shape at higher temperature. This unusual behavior has been termed the "shape-memory effect."

Without being held to any particular theory, it is currently believed that the shape-memory effect is based on the continuous appearance and disappearance of the martensite phase with falling and rising temperatures. This thermoelastic behavior is the result of the transformation from a parent phase stable at elevated temperature to the martensite phase. A specimen in the martensite phase may be deformed in what appears to be a plastic manner but is actually deforming as a result of the growth and shrinkage of self-accommodating martensite plates. When the specimen is heated to the temperature of the parent phase, a complete recovery of the deformation takes place. Complete recovery in this process is limited by the fact that strain must not exceed a critical value which ranges, for example, from 3-4% for copper shape-memory alloys to 6-8% for nickel-titanium shape-memory alloys.

Figure 1:
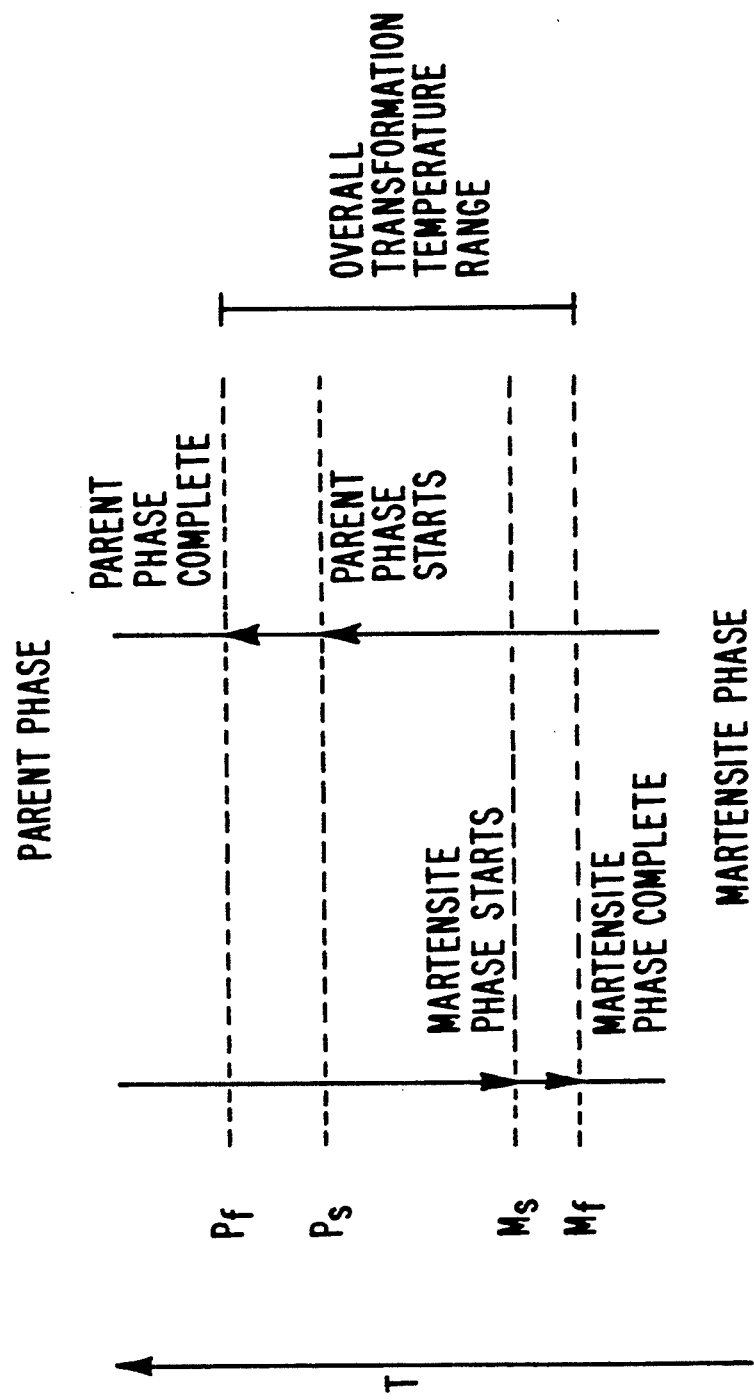
FIG. 1 illustrates the various phase transformations of a shape memory alloy with a change in temperature.

According to FIG. 1, the temperature T at which the martensite phase starts to form from the parent phase on cooling is referred to as $M_s$ and the temperature at which the parent phase has been completely transformed to the martensite phase is $M_f$. On heating a martensitic specimen, the temperature at which the transformation begins to reverse to the parent phase is designated $P_s$. The reverse transformation to the parent phase is completed at a higher temperature designated $P_f$. Although a single parent phase typically forms on heating, the martensite phase usually displays a number of variants on cooling.

Note that there is typically a slight hystersis between the forward and reverse transformation ranges, so that the transformation from parent phase to the martensite phase on cooling occurs over a slightly lower range ($M_s$ to $M_f$) than the reverse transformation on heating ($P_s$ to $P_f$). The range $M_s$ to $M_f$ is herein referred to as the "martensite transformation temperature range"; the range $P_s$ to $P_f$ is herein referred to as the "parent transformation range". The temperature range encompassing $M_s$, $M_f$, $P_s$ and $P_f$ is defined herein as the "overall transformation temperature range."

It is possible to condition or "train" a shape-memory effect alloy to have a two-way shape-memory effect. The two-way shape-memory effect is a spontaneous, reproducible, reversible shape change associated with heating and cooling throughout the overall transformation temperature range. The reversible shape change could be, for example, bending and unbending or twisting and untwisting as the trained shape-memory effect alloy sample is cycled between the $M_f$ and $P_f$ temperatures (i.e., through the overall transformation temperature range).

Alloys for which two-way shape-memory effect has been observed include Cu-A, Cu-Zn-A, In-T and Ti-Ni. This two-way shape-memory conditioning is apparently brought about by limiting the number of martensite variants that form upon cooling through the application of an external stress during the transformation. It is believed that the limit imposed upon the number of variants formed reduces the self-accommodating feature of the usual transformation and increases the residual stress. By repeating the process a number of times, the restricted variant group and its associated internal stress spontaneously revert to the parent phase on heating and then to a singular martensite group on cooling. The two-way shape-memory training procedure can be illustrated by the following examples:

(a) A straight wire is cooled below $M_f$ and bent to a desired shape. The bending stress is accommodated by the formation of a reduced number of preferred variants of martensite plates. The specimen is then heated to a temperature above $P_f$ and becomes straight again. This procedure is repeated 20-30 times. This completes the training, and the sample now bends to its programmed shape when cooled below $M_f$ and becomes straight when heated above $P_f$. After the initial training, the reversible shape change associated with cooling and heating may be repeated indefinitely.

(b) The wire is deformed or bent above $M_s$ to produce preferred variants of stress-induced martensite and is then cooled below $M_f$. Upon subsequent heating above $P_f$ the wire becomes straight again. This procedure is repeated about 20-30 times to complete the memory training.

Thus, once the two-way shape-memory effect has been achieved, a specimen can, for example, assume a stable high temperature configuration when the metal is raised above $P_f$ and assume a stable low temperature configuration when the metal is cooled below $M_f$.

Cloue U.S. Pat. No. 4,699,757 describes the use of shape memory alloys in fuel pellet holddown devices. It is directed, however, to a radially expandable element having a cross-sectional area such that it frictionally engages an internal surface of the fuel rod cladding. When the fuel rod is brought up to reactor operating temperature, the radially expandable element if contracted clear of frictional contract by means of a shape-memory alloy. U.S. Pat. No. 4,699,757 is concerned with holding down the fuel on the pellet stack only during transport and handling of the rods. In contrast, the holddown spring of the present invention does not concern radial expansion, and it is used to maintain force on the pellet stack during both thermal expansion and contraction of the pellet stack.

Fuel pellet holddown springs formed from a shape-memory alloy can be designed such that the holddown spring expands to a high temperature configuration (parent phase) when heated to a temperature above the overall transition temperature range and contracts to a low temperature configuration (martensite phase) when cooled to a temperature below the overall transition temperature range. Of course, the shape-memory holddown spring will exert a greater force at high temperatures than at low temperatures.

The transition temperature range, as well as the relative forces exerted by holddown springs constructed from shape-memory alloys, can be adjusted by varying the specific alloy compositions. The relative force exerted will also be determined by the degree of preliminary spring compression and by the treatment during the "programming" of the shape-memory alloy holddown spring.

Essentially any shape-memory alloy can be used in the present invention so long as it demonstrates adequate two-way shape-memory effect and possesses an overall transition temperature range substantially above room temperature and substantially below the temperature of the environment to which the shape-memory alloy is subjected during reactor operation. Shape-memory alloys also preferably exhibit good corrosion resistance under reactor operating conditions and ideally exhibit low neutron capture cross-section. Presently preferred shape-memory alloys for the practice of the present invention include nickel-titanium alloys (also known as Tinel alloys) such as Raychem's K or BH alloys.

Nickel-titanium alloys exhibit a narrow hystersis curve, with their strength varying dramatically from one phase to the other. This results in low reset forces and excellent fatigue life.

The overall configuration of the holddown spring is preferably a coil configuration, but other configurations such as that of a simple compressed arch will readily become apparent to those of skill in the art.

Figure 2:
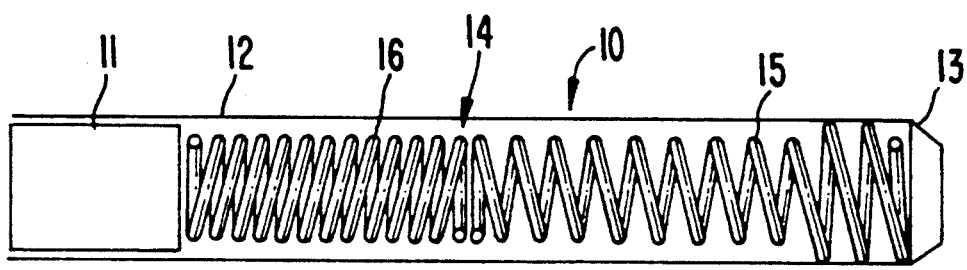
FIG. 2 illustrates a low temperature configuration of a holddown spring designed in accordance with an embodiment of the present invention.
Figure 3:
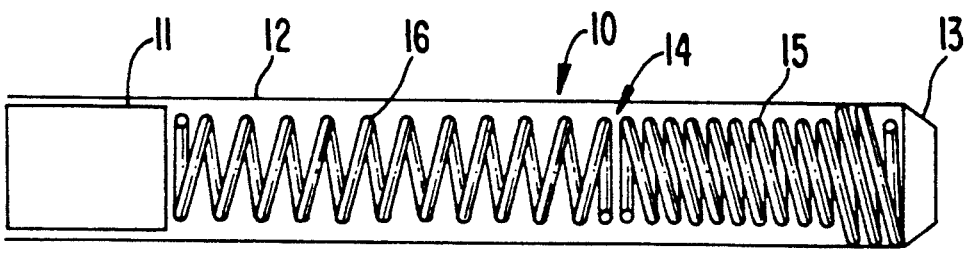
FIG. 3 illustrates a high temperature configuration of the holddown spring of FIG. 2.

A presently preferred embodiment is shown in FIGS. 2 and 3. A fuel rod 10 is depicted wherein a fuel pellet stack 11 within a fuel rod cladding 12 is compressed by means of a composite holddown spring 14 interposed between the fuel pellet stack 11 and a fuel rod end cap 13. The composite holddown spring 14 comprises a conventional spring portion 15, such as that of stainless steel, and a shape-memory alloy spring portion 16, such as that of a nickel-titanium alloy.

The composite holddown spring 14 is used to exert a continuous force on the fuel pellet stack 11 during all phases of operation, including shipping and operation.

As discussed above, the shape-memory alloy spring portion 16 of the composite holddown spring 14 can be constructed such that it expands to a high temperature configuration at temperatures above the overall transition temperature range of the alloy and contracts to a low temperature configuration at temperatures below the overall transition temperature range. Somewhat conversely, the conventional spring portion 15 of the composite holddown spring 14 weakens, and is thus compressed, at high temperatures and strengthens, and thus expands, at low temperatures.

FIG. 2 shows the configuration of the composite spring 14 at low (ambient) temperatures. FIG. 3 shows the configuration of the composite spring 14 at high (operating) temperatures. As shown in FIG. 3, when reactor coolant temperatures increase, the shape memory alloy spring portion 16 expands while the conventional spring portion 15 contracts. As shown in FIG. 2, when coolant temperatures decrease, the shape memory alloy spring portion 16 contracts while the conventional spring portion 15 expands.

Since a self-locking stainless steel spring is currently being sold by Combustion Engineering, Inc., the conventional spring portion 15 is preferably inserted last. Nevertheless, if it is found to be advantageous to place the conventional spring portion 15 against the fuel pellet stack 11 and insert the shape memory alloy spring portion 16 last (e.g., due to temperature or neutron flux considerations), this change could be easily made.

It is believed that significant hydrogen concentration may cause failures in shape-memory alloys due to hydrogen embrittlement. However, in fuel rods, hydrogen levels are very low with limits of 0.6 ppm set for the fuel pellets. It is, therefore, believed that hydrogen embrittlement will not be a problem in present invention.

Although there are many additional specific designs which can be developed from the foregoing description, one skilled in the art can easily ascertain the essential characteristics of this invention, and without departing from the spirit and scope thereof, can make various changes and modifications of the invention to adapt it to various usages and conditions.

We claim:

1. An apparatus comprising:
    a nuclear rector fuel rod including a plurality of fuel pellets comprising a fuel pellet stack in said nuclear fuel rod;
    means, including a composite holddown spring, for applying an axial force to said fuel pellet stack in a nuclear reactor fuel rod, said axial force applying means comprising a shape-memory alloy spring portion having an overall transformation temperature range substantially above atmospheric temperature and substantially below an operating temperature experienced by said composite holddown spring, said shape-memory alloy spring portion having a two-way memory characteristic such that said shape-memory alloy spring portion contracts to a first configuration below said overall transition temperature range wherein said axial force exerted by said shape-memory alloy spring portion on said fuel pellets in said stack is minimized and expands to a second configuration above said overall transition temperature range wherein said axial force exerted by said shape-memory alloy spring portion on said fuel pellets in said stack is maximized; and
    a conventional metal spring portion having the characteristic that said conventional metal spring portion weakens and contracts at said operating temperature and strengths and expands at said atmospheric temperature.

2. The composite holddown spring of claim 1, wherein said shape-memory alloy spring portion comprises a titanium-nickel alloy.

3. The composite holddown spring of claim 1, wherein said conventional metal spring portion comprises a stainless steel.

4. The composite holddown spring of claim 1, wherein said shape-memory alloy spring portion and said conventional metal spring portion are provided in a coiled configuration.

5. A nuclear fuel rod comprising:
    a zirconium alloy cladding tube;
    zirconium alloy endcaps disposed at each end of said cladding tube;
    a stack of a plurality of axially-extending uranium dioxide fuel pellets axially disposed within said cladding tube; and
    a composite holddown spring disposed between at least one of said endcaps and said stack of uranium dioxide fuel pellets, said composite holddown spring further comprising a shape-memory alloy spring portion having an overall transformation temperature range substantially above atmospheric temperature and substantially below an operating temperature experienced by said composite holddown spring, said shape-memory alloy spring portion having a two-way memory characteristic such that said shape-memory alloy spring portion contracts to a first configuration below said overall transition temperature range wherein said axial force exerted by said shape-memory alloy spring portion on said plurality of fuel pellets is minimized and expands to a second configuration above said overall transition temperature range wherein said axial force exerted by said shape-memory alloy spring portion on said plurality of fuel pellets is maximized and
    a conventional metal spring portion having the characteristic that said conventional metal spring portion weakens and contracts at said operating temperature and strengthens and expands at said atmospheric temperature.

6. The composite holddown spring of claim 5, wherein said shape-memory alloy spring portion comprises a titanium-nickel alloy.

7. The composite holddown spring of claim 5, wherein said conventional metal spring portion comprises a stainless steel.

8. The composite holddown spring of claim 5, wherein said shape-memory alloy spring portion and said conventional metal spring portion are provided in a coiled configuration.

* * * * *